Nov. 27, 1945.  F. REINGRUBER ET AL  2,389,686
THERMOSTAT
Filed March 20, 1943  2 Sheets-Sheet 1
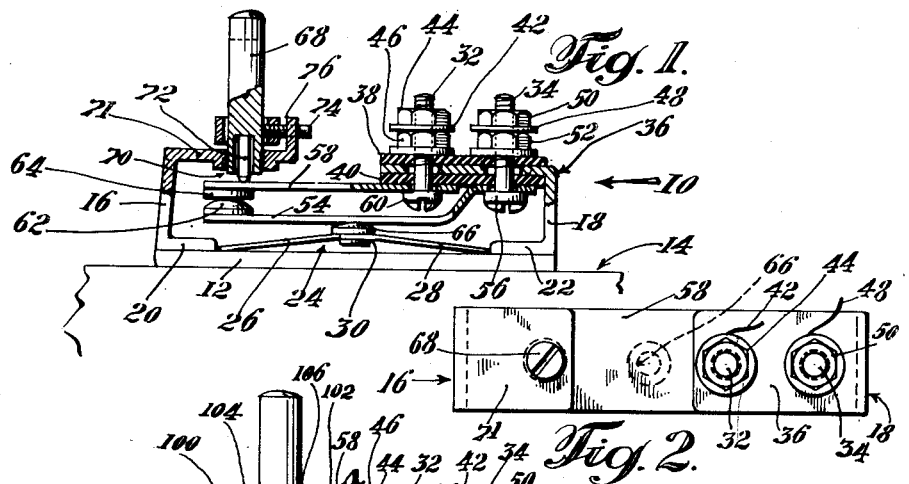
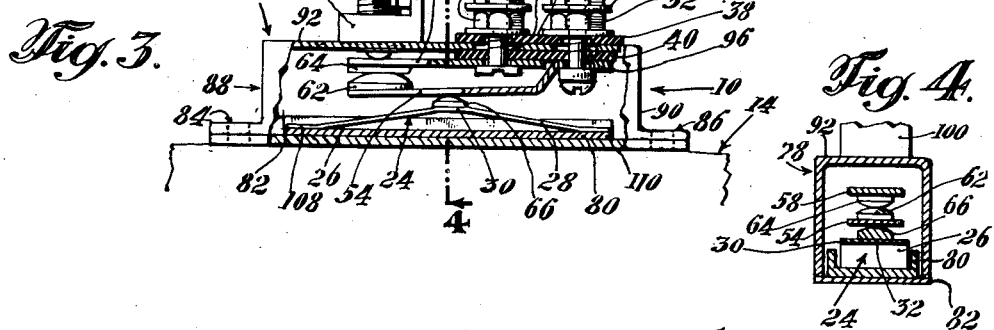
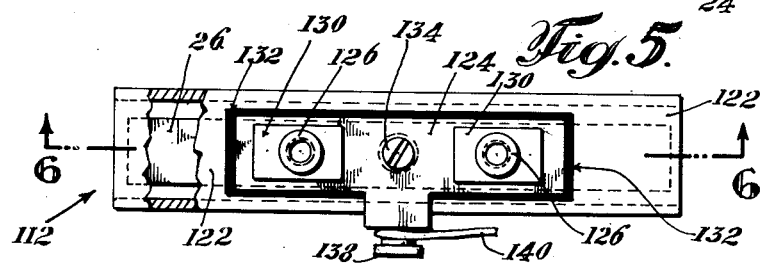
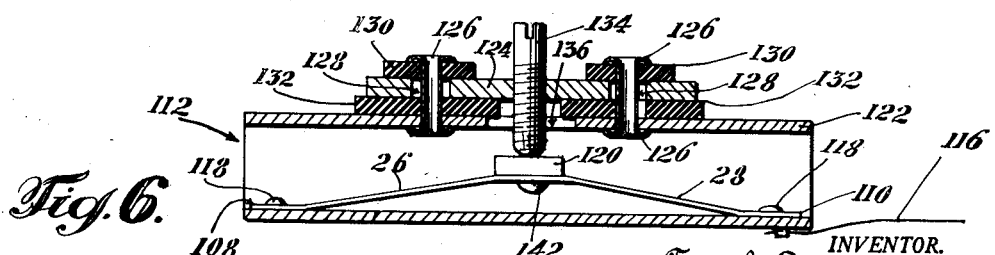
INVENTOR.
Frank Reingruber
BY Joseph Reingruber
Irving F. Goodfriend

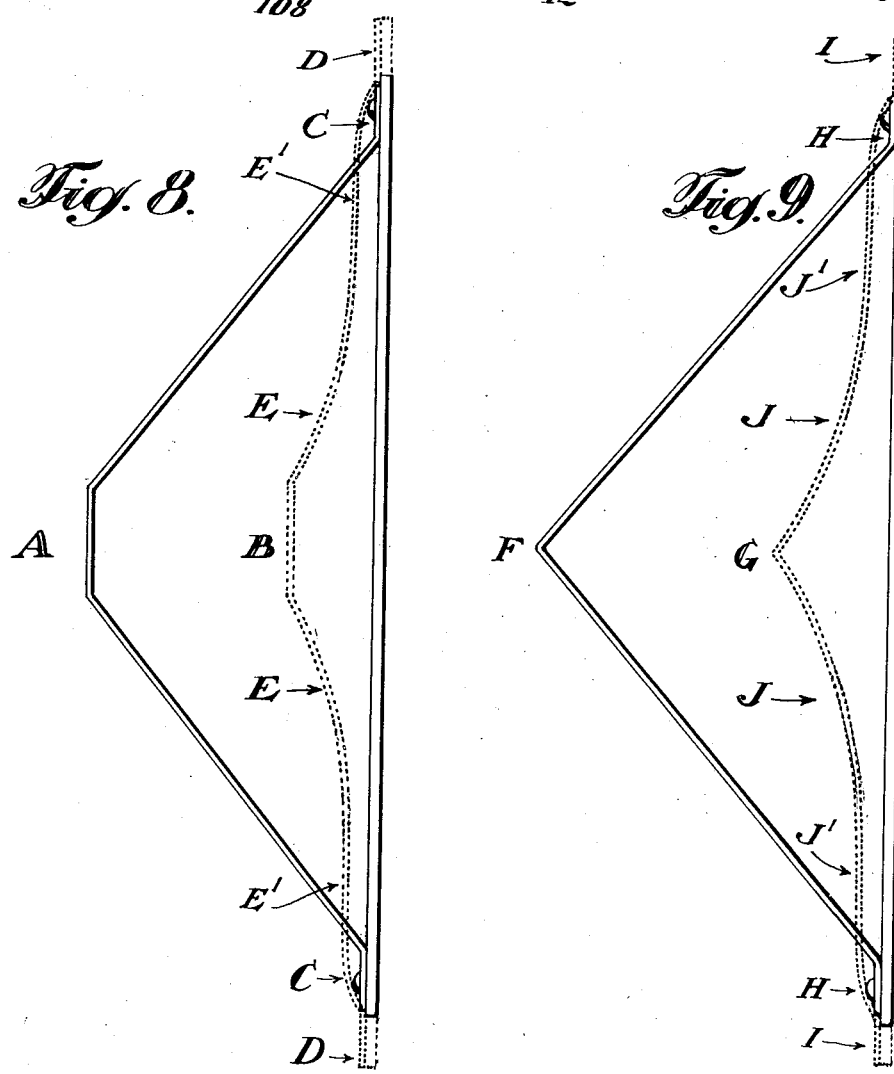

Patented Nov. 27, 1945

2,389,686

UNITED STATES PATENT OFFICE 2,389,686

THERMOSTAT

Frank Reingruber and Joseph Reingruber,
New York, N. Y.

Application March 20, 1943, Serial No. 479,860
In Canada June 5, 1942

4 Claims. (Cl. 200—137)

The present invention relates to thermostats and more particularly to that type in which is employed two metals of dissimilar heat expansion characteristics to actuate a control, whether an electric switch, relay, valve or the like.

Our invention contemplates the provision of a comparatively sensitive thermostat so designed and constructed that the relatively small movement of the expanding metal is translated into a larger, multiplied or magnified movement of the control operating element and therefore provides a thermostat that reacts rapidly to relatively small changes in temperature.

Our invention further contemplates a thermostat of such construction that it may be readily applied in direct contact with the device to the temperature of which the thermostat is designed to react, and thereby one adapted to quickly react to relatively small changes in temperature thereof, thereby increasing the sensitivity of regulation and limiting the tendency of the device to overshoot the temperature for which the thermostat is set.

Our invention still further contemplates the provision of a thermostat which is simple and rugged in construction, self contained in a casing that may be conveniently applied as a unit to the article, the temperature of which is to be regulated.

Our invention also contemplates the provision of such a thermostatic unit that is relatively small in size and compact, reliable in operation and readily adjustable.

Other and further objects and advantages of the present invention and the uses to which it may be put as well as the devices to which it may be applied will be clear from the description which follows and the drawings appended thereto, in which drawings, throughout all the figures thereof like reference characters are used to designate similar parts and in which Fig. 1 is a side elevation of a thermostat unit, according to our invention, broken away and in partial section to show the relative arrangement of the parts Fig. 2 is a plan view thereof Fig. 3 is a side elevation of a modification of our invention and broken away and in partial section to show the relative arrangement of the parts Fig. 4 is a section on the line 4—4 of Fig. 3

Fig. 5 is a plan view of a further modification of our invention

Fig. 6 is a section on the line 6—6 of Fig. 5

Fig. 7 is a schematic elevation of the temperature responsive mechanism as associated with a modification of our invention Fig. 8 is an exaggerated schematic illustration of the expansion characteristics of the temperature responsive mechanism, according to our invention Fig. 9 is a similar illustration of a modification thereof.

Referring now to the drawings and particularly to Figs. 1 and 2, we have shown there, by way of example, an embodiment of our invention, which for illustration may be applied to a device, such as an electric flatiron, having a flat surface or body, the temperature of which is to be controlled, and on which the thermostat may be mounted, as a separate unit, in good heat transfer relation therewith.

The temperature responsive mechanism, according to our invention, of a thermostat unit 10 is provided with the flat bar 12, of metal having a relatively high coefficient of expansion, such as brass or aluminum, which bar is mounted on, in contact with a surface 14 of the device, the temperature of which is to be controlled.

The bar 12 has secured to its upper surface the supporting brackets 16 and 18, each of which has a lower inturned flange or arm 20 and 22, to which the bar 12 is secured in any suitable manner, as by welding.

Each flange 20 and 22 constitutes an abutment between which the control operating member 24 is carried.

The member 24 is of length somewhat greater than the linear distance between the abutment flanges 20 and 22 and is formed of a spring-like metallic material, such as relatively thin plate steel having a comparatively low coefficient of expansion and of characteristics such that its resiliency is retained at the highest temperatures to which it may be subjected in the normal operation of the device with which the thermostat is associated.

The member 24 comprises the flat or straight, convexedly unbowed, legs 26 and 28, inclined toward each other upwardly from their ends toward the flat preferably unbowed platform-like element 30 at the centre of the member 24, into which the legs merge.

The member 24 is sprung between the abutments 20 and 22, which push against the legs 26 and 28 so that the wall-like element 30 is under an upward tension and assumes the normal position and form illustrated in the drawings.

To carry the terminal posts 32 and 34, the bracket 18 is provided with the upper inturned flange or arm 36 extending toward the centre of the unit 10, which posts are insulated from the bracket 18 and each other by suitable insulation, such as the sheets of mica 38 and 40.

The terminal posts 32 and 34 are connected in series in the electrical heating circuit (not shown) by securing the lead wire 42 to the post 32, as by the lock nuts 44 and 46 and the lead wire 48 to the post 34, as by the lock nuts 50 and 52.

The make and break switch, which is opened and closed by the members 12 and 24, constituting the temperature responsive mechanism of the thermostat unit, comprises the downwardly tensioned element 54, secured at one end to the terminal post 34, as by the head 56 of the set screw which constitutes the post, and the substantially parallel positioned spring, upwardly tensioned, element 58, which is secured at one end to the other terminal post 32, as by the head 60 of the set screw which constitutes the post.

The element 54 has secured at its other end the contact point or button 62 which is normally held by the upward tension of the member 24 in switch closing position against the contact point or button 64 secured to the other end of the tension element 58, the element 54 pressing and riding against the insulating button 66, secured to the platform-like element 30, under the control of the member 24.

In use, the bar 12 of the thermostat unit 10 is mounted in good heat contact with a surface 14 on the body, the temperature of which is to be controlled, and secured thereto at only one point in its length so that it will be free to expand longitudinally or linearly, independently of any expansion of the controlled device.

As the device, the temperature of which is to be controlled, is heated, as by a resistance in the electrical circuit, heat is transferred from the device to the readily linearly expandible bar 12 and through it only to a limited extent to the member 24.

This other member 24 has a lower coefficient of expansion than the bar 12 and actual contact between them is limited to that at the abutments 20 and 22, though it will be understood that a relatively small part of the member 24 may instead be secured at the very end of each leg 26 and 28, to the bar 12, as hereinafter described in reference to the modification illustrated in Fig. 3.

The bar 12 expands linearly a greater distance and in a much shorter time than does the member 24, since the coefficient of expansion of the former is higher than that of the latter.

As a result, the abutments 20 and 22 move away from the legs 26 and 28, permitting the tension member 54 to push the button 66 down, causing the entire member 24 to "sag," flex or collapse, the legs flattening out as the ends thereof follow the abutments, which move away from them.

By reason of the inclined to each other, straight, convexedly unbowed legs, 26 and 28, the wall-like element 30 moves down a comparatively large distance (A to B, Fig. 8) for a short expansion (C to D, Fig. 8) of the bar 12.

Therefore the contact points 62 and 64 will separate relatively quickly for a comparatively small temperature change, resulting in a sensitive thermostat.

Further, since the member is free in the centre thereof, the ends being held by the abutments, and since the legs 26 and 28 are straight and therefore not stiff and rigid but comparatively free to bend, as would be a bowed member, they sag in the middle, that is concavedly curve, as illustrated at E by the broken lines of Fig. 8.

This condition is caused by the relatively small radial sharp bends at a point where 24 and 28 communicate with or merge into platform 30.

In order to provide means for adjusting operative limits of the thermostat, we mount the vertically adjustable calibrating member 68 in the upper flange or arm 71 of the bracket 16 and which flange or arm extends inwardly over the switch elements or arms 54 and 58.

The lower end of the calibrating member 68 is threaded into a tapped aperture 70 in the flange or arm 71 and carries the insert 72 of suitable insulating material, such as a ceramic, and which insert bears against the switch element or arm 58, which is tensioned upwardly thereagainst.

Vertical adjustment of the member 68 determines the position of contact 64 and thereby establishes the temperature at which contact 62 will separate from it.

If desired the vertical adjustment of the calibrating member 68 may be limited to a selected range by means of an adjustable collar provided with a set screw 74 arranged to cooperate with a fixed stop 76, extending from the flange or arm 71.

Referring now to Figs. 3 and 4, we have there illustrated a thermostat which is mounted in and completely enclosed in a housing or casing 78, which, as a unit, may be secured in any suitable manner to a surface 14 of the device, the temperature of which is to be regulated.

In a modification here illustrated, the control operating member 24, which is flexed by the expansion of the linearly expanding member, is secured at the ends of its legs 26 and 28, preferably as by spot welding, to the linearly expansible channel bar 80, thereby dispensing with the abutments 20 and 22, illustrated in Fig. 1, although it will be understood that such abutments for holding the member 24 may be formed integrally in the bar.

The modification of our invention illustrated in Figs. 3 and 4, operates substantially the same as that illustrated in Figs. 1 and 2, except that the member 24 is collapsed or flexed by the outward pull on the toes 108 and 110 imposed thereon by the expansion of the bar 80, to which they have been secured, to thereby separate the legs and lower the centre portion of the member, which opens the switch means.

The member 24 in this modification has at the end of its legs 26 and 28, a sharp bend which forms the toes 108 and 110.

As a result of this additional bend, the legs 26 and 28 will flex or curve concavedly adjacent the platform element 30 and curve convexedly upward at the toe ends as illustrated respectively at E and E' by the broken lines of Fig. 8.

This further adds to the magnitude of the downward movement of the platform element 30 for a given expansion of the bar 12 or 80 making the thermostat still more sensitive.

The interior of the housing or casing 78 is closed by the base plate 82, at one point of which, preferably the centre, the bar 80 is secured, as by spot welding.

The bar 80 is therefore free to expand from its centre at the ends to operatively pull the legs 26 and 28 apart.

The base plate 82, is secured to the flanges 84 and 86, extending from the end walls 88 and 90 of the housing or casing 78, in any suitable manner.

The terminal posts 32 and 34 are mounted on the top wall 92 of the box-like inclosure or housing 78, which has the openings 94 and 96 through which the posts extend.

The posts are insulated from the top wall and each other by the mica sheets 38 and 40.

The tension member 54 presses downwardly and rises against the insulating button 66 on the platform-like element 30 of the control operating member 24.

The calibrating member 68 may be mounted in the tapped collar 100, on the top wall 92, which is suitably dulled so that an end of the calibrating member 68 may enter the interior of the housing against the switch element 58 to selectively position it.

The collar 100 may be provided with the projecting stop 102 and the member 68 with a fixed washer 104 having the lug 106, which cooperates with the stop 102 to limit the adjustment of the member 68 over a desired range.

Upon contraction of the bar 80, as it cools, the member 24 is positively returned to its normal switch means closing position and shape.

Referring now to Figs. 5 and 6, we have there illustrated a modification of our invention which is particularly adapted for use with a low temperature device, such as an electric heating pad.

In this modification the parts of the thermostat are housed in the casing 112, which itself serves as one electrode and therefore has secured to one side 114 thereof the lead wire 116.

The housing or casing 112 constitutes the heat expanding member of this modification and is formed from a hollow bar, tube or rod of material having a relatively high coefficient of expansion.

The legs 26 of the flexible or collapsible member 24 are secured in the interior of the casing 112, as by welds 118, at the toes 108 and 110 thereof to the inside surface of a wall.

The member 24, as pointed out has a relatively low coefficient of expansion and is made of metal which is an electrical conductor, such as spring steel, and has secured to the platform-like element 30 at its midpoint, the electrical contact 120, which serves as the movable terminal of the switch means.

On the exterior of the casing 112, at an opposite wall 122, we secure the contact bracket 124, by any suitable means such as the staples 126, which extend into the openings 128 in the wall and are peened over the edges thereof to grip the various parts in place.

The contact bracket 124 is insulated from the casing 112, by the mica sheets 130 and 132, held in place by the staples 126.

The contact bracket 124 is provided with a tapped aperture in which the calibrating screw 134, constituting the other fixed terminal of the switch means, is received so that it extends through the opening 136, in the wall 122, in contact with and against the electrical contact 120.

Extending from the bracket 124, as an integral part thereof, we provide the terminal binding post 138 to which the lead wire 140 is secured.

The electrical circuit is therefore from the source (not shown) through the lead wire 116, the casing 112, contact 120, calibrating screw 134, bracket binding post 138 and through the lead wire 140 to the source.

The electrical contact 120, which is pulled away from the calibrating screw 134 upon heat expansion of the casing 112, returning in contact therewith upon contraction of the casing, constitutes together with the screw 134 to make and break switch which is controlled by the expanding and positively moved members of the temperature responsive mechanism.

The embodiment illustrated in Figs. 5 and 6 operates substantially the same as the other heretofore described embodiments except that the expanding member constitutes the casing and the flexed member constitutes with the calibrating member the make and break switch.

Referring now to Fig. 7, we have there schematically illustrated an embodiment of our invention, in which the flexed member 24 positively moves the arm 144 down as the member is collapsed or flexed by the expansion of the bar 12, to which the toe elements 108 and 110 of the legs 26 and 28 are secured.

The arm 144 is normally tensioned against the member 24 in the crotch formed where the inclined legs 26 and 28 meet and may be operatively connected to a valve, indicator, relay, etc., to operate it.

Any suitable conventional tension means and construction which will urge the arm 144 in the normal position illustrated may be used and since it forms no part of our invention details thereof need not be given, a spring and pivot connection to the arm, serving as an example.

As the bar 12, which is in good thermal contact with the device, with which the thermostat is associated, expands, the arms 144 is positively operated by the thereby flexed member 24, to open or close a valve, operate a relay or indicator, etc.

Upon cooling, the bar 12 contracts, returning the member 24 to its original shape and position thereby permitting the tensioned arm 144 to return to its normal position.

As illustrated in the schematic drawing of Fig. 9, the central portion of the member 24 at line of bend F, is drawn downwardly from F to G by the expansion of the expansible member from H to I, the legs also flexing along the concavo-convex curve at J, because originally they were straight and the spring member sharply bent at its centre and at the toes and which assumed curvilinear shape also adds to the multiplied lowering of the line of bend.

The relative dimensions of the various elements of the temperature responsive mechanism used with any embodiment of our invention will vary in practice.

The platform is preferably considerably smaller than the two legs and the angle where they meet it or each other and the toes should not be rounded but relatively sharp as illustrated, which construction we have found results in the relatively large downward movement sought at the centre of the spaced member for a given expansion of the other member and the concavo-convex flexing of the legs, which also adds to accomplishment of this result.

It will be seen that we have provided a sensitive thermostat in which a relatively small linear movement of a heat expanded member is translated into a comparatively greater, multiplied or magnified movement of the member controlling the operation of the device.

It is further apparent that we have provided a thermostat in which the temperature responsive mechanism comprises a member that readily expands or contracts under the influence of changes in temperature to flex a second member which is spaced from it except at its ends, to thereby operate a control.

It is still further apparent that we have provided a simple, rugged, self-contained, compact and relatively small thermostat that is reliable in operation and readily adjustable.

While we have illustrated specific embodiments of our invention, we do not intend to be limited to the specific details shown, but intend to claim our invention as broadly as the prior art and the scope of the appended claims permit.

We claim:

1. In a thermostat, an enclosing housing comprising a pair of spaced supporting brackets, each bracket having an inturned flange, each flange spaced from the other flange, a bar having a relatively high coefficient of expansion, the bar secured at one end to one flange and at the other end to the other flange, a spring-like member bent at the center and spaced thereat from the bar to form straight unbent legs extending therefrom to the bar, said member having a low coefficient of expansion and sprung between the flanges and a switch tensioned against the member, each said leg arranged in communication at the end thereof with the bar, each leg thereby adapted to move with the bar against the adjacent flange, upon the expansion and contraction thereof to open and close the switch.

2. The thermostat of claim 1, including a calibrating member on one of the brackets and operatively engaging the switch.

3. In a thermostat, supporting means comprising a pair of opposed separated brackets, each bracket having an upper and a lower inturned flange, a rigid linearly heat expanding and contracting member having a relatively high coefficient of expansion, said member secured at one end to the lower flange of one bracket and at the other end to the lower flange of the other bracket, a spring member spaced from the first mentioned member and bent at its centre to form straight unbent legs extending therefrom to the first mentioned member and switch means in engagement with the spring member on the upper flange of one of the brackets, the ends of the spring member movable with the lower flanges upon expansion and contraction of the first mentioned member to open and close the switch.

4. The thermostat of claim 3 and including a calibrated member on the upper flange of the other bracket in engagement with the switch.

FRANK REINGRUBER.
JOSEPH REINGRUBER.